US007092882B2

(12) United States Patent
Arrowood et al.

(10) Patent No.: US 7,092,882 B2
(45) Date of Patent: Aug. 15, 2006

(54) NOISE SUPPRESSION IN BEAM-STEERED MICROPHONE ARRAY

(75) Inventors: Jon A. Arrowood, Atlanta, GA (US); Michael S. Miller, Dunwoody, GA (US)

(73) Assignee: NCR Corporation, Dayton, OH (US)

( * ) Notice: Subject to any disclaimer, the term of this patent is extended or adjusted under 35 U.S.C. 154(b) by 1154 days.

(21) Appl. No.: 09/731,084

(22) Filed: Dec. 6, 2000

(65) Prior Publication Data

US 2002/0069054 A1 Jun. 6, 2002

(51) Int. Cl.
*G10L 15/20* (2006.01)

(52) U.S. Cl. ...................... 704/233; 704/231; 704/270; 704/226

(58) Field of Classification Search ................ 704/226, 704/233, 231, 270, 275
See application file for complete search history.

(56) References Cited

U.S. PATENT DOCUMENTS 4,653,102 A * 3/1987 Hansen ........................ 381/92
4,845,636 A * 7/1989 Walker ....................... 700/237
5,400,409 A * 3/1995 Linhard ....................... 381/92
5,574,824 A * 11/1996 Slyh ........................... 704/226
5,737,485 A * 4/1998 Fanagan .................... 395/2.41
5,940,118 A * 8/1999 Van Schyndel .............. 348/14
6,009,396 A * 12/1999 Nagata ....................... 704/270
6,061,646 A * 5/2000 Martino ......................... 704/3
6,363,345 B1 * 3/2002 Marash ....................... 704/226

OTHER PUBLICATIONS

Merks et al. "Design of a Broadside Array for a Binaural Hearing Aid." Applications of Signal Processing to Audio and Acoustics, 1997. 1997 IEEE ASSP Workshop on , Oct. 19-22, 1997.*

* cited by examiner

*Primary Examiner*—Vijay Chawan
(74) *Attorney, Agent, or Firm*—Greg Welte

(57) ABSTRACT

A system for suppressing unwanted signals in steerable microphone arrays. The lobes of a steerable microphone array are monitored, to identify lobes having large speech content and low noise content. One of the identified lobes is then used to deliver speech to a speech recognition system, as at a self-service kiosk.

4 Claims, 9 Drawing Sheets

NOISE SUPPRESSION IN BEAM-STEERED MICROPHONE ARRAY

The invention concerns suppression of unwanted sound in steered microphone arrays, especially when used to capture human speech for a speech-recognition system.

BACKGROUND OF THE INVENTION

Beam-steered microphone arrays are in common usage, as in telephone conferencing systems. For example, electronic circuitry steers a beam toward each of several talking conference participants, to capture the participant's speech, and to reduce capture of (1) the speech of other participants, and (2) sounds originating from nearby locations. To facilitate understanding of the Invention, a brief description of some of the basic principles involved in beam steering will first be given.

The left side of FIG. 1 shows (1) an acoustic SOURCE which produces an acoustic signal 3, and (2) four omni-directional microphones M1–M4 which receive the signal 3.

The right side of FIG. 1 shows that the signal does not reach the microphones M at the same time. Rather, the signal reaches M1 first, and M4 last, because M4 is farthest away. The delays in reaching the microphones are labeled as D1, D2, and D3.

FIG. 2, left side, shows delay D3 resulting from the longer distance. If, on the right side of the Figure, an artificial delay D3, produced by circuit C, is added electronically to the output of microphone M1, then the outputs of M1 and M4 both require a time of (T+D3) to reach the summer SUM. That is, an actual delay D3 exists, and an artificial delay D3 is introduced, as indicated. Both microphone outputs now reach the summer SUM at the same time. The summer SUM produces output SUM1.

Similar delays D2 and D3 are applied to the outputs of microphones M3 and M2, respectively, causing them to reach summer SUM simultaneously also.

Consequently, because of the artificial delays introduced, the four signals, produced by the four microphones, reach the summer SUM simultaneously. Since the four signals arrive simultaneously, they are inphase. Thus, they all add together.

For example, if the signal produced by the SOURCE is a sine wave, such as (A sin t), the output of the summer SUM will be 4(A sin t). THEREFORE, in effect, the signal produced by the SOURCE has been amplified, by a gain of four.

It can be easily shown that, if the SOURCE moves to another position, the gain of four produced by the summer SUM will no longer exist. A smaller gain will be produced. Thus, the particular set of gains shown, namely the set (zero, D1, D2, and D3), will preferentially amplify sound sources located at the location of the SOURCE shown in FIG. 2, compared with sources at other locations. The preferential amplification effectively suppresses sound emanating from other locations.

If the delays are kept the same, but re-arranged, as in FIG. 3, a mirror-image situation is created. Now the sound emanating from SOURCE 1 is preferentially amplified. Centerline 5 acts as the mirror.

In general, a collection 7 of the appropriate sets of delays will allow selective amplification of sources, at different positions, as in FIG. 4. To selectively amplify a given source, the appropriate set of delays is selected, and used.

In actual practice, the selective amplification is not as precise as the Figures would seem to indicate. That is, the selective amplification does not focus on a single, geometric point or spot, and amplify sounds emanating from that point exclusively. One reason is that the summations discussed above are valid only at a single frequency. In reality, sound sources transmit multiple frequencies. Another reason is that the microphones are not truly omni-directional. Thus, for these, and other reasons, the selective amplification occurs over cigar-shaped regions, termed "lobes." FIG. 5 illustrates lobes L1–L5.

The lobes must be correctly understood. The lobes, as commonly used in the art, do not indicate that a sound source outside a lobe is blocked from being received. That is, the lobes do not map out cigar-shaped regions of space. Rather, the lobes are polar geometric plots. They plot signal magnitude against angular position. FIG. 6 provides an example.

The left side of the Figure shows a polar coordinate system, in which every point existing on the lobe, or plot P (such as points A and B on the right side) indicates (1) a magnitude and (2) an angle. ("Angle" is not an acoustic phase angle, but physical angle of a sound source, with respect to the microphone array, which is taken to reside at the origin.) The right side of the Figure shows two sound sources, A and B. As indicated, source A is located at 45 degrees. Its relative magnitude is about 2.8. Source B is located at about 22.5 degrees. Its relative magnitude is about 1.0.

Thus, the Figure indicates that source A will be amplified by 2.8. Source B will be amplified by 1.0.

Point D in FIG. 6 would appear to lie outside the plot. However, point D is "illegal." The reason is that, again, the plot P is polar. Point D represents an angle, which is 45 degrees. The system gain at that angle is already represented by point A, which is on the plot P. Point D does not exist, for this system.

Restated, point D cannot be used to represent a source. If a source existed at the angle occupied by point D, then point A would indicate the gain with which the system would process that source.

One problem with beam-steered systems is that a noise source, such as an air conditioner or idling delivery truck, can exist within the lobe along with a talking person. The person's speech, as well as the noise, will be picked up.

OBJECTS OF THE INVENTION

An object of the invention is to provide an improved microphone system.

A further object of the invention is to provide a microphone system which suppresses unwanted noise sources, while emphasizing sources producing speech.

A further object of the invention is to provide a microphone system which suppresses unwanted noise sources, while emphasizing sources producing speech, which is used in a speech-recognition system.

SUMMARY OF THE INVENTION

In one form of the invention, a self-service kiosk contains speech-recognition apparatus. A steerable-beam microphone array delivers captured sound to the speech-recognition apparatus. Other apparatus locates a lobe of the microphone array which contains (1) a maximal speech signal, (2) a minimal noise signal, or both, and uses that lobe to capture the speech.

DETAILED DESCRIPTION OF THE INVENTION

Figure 7:
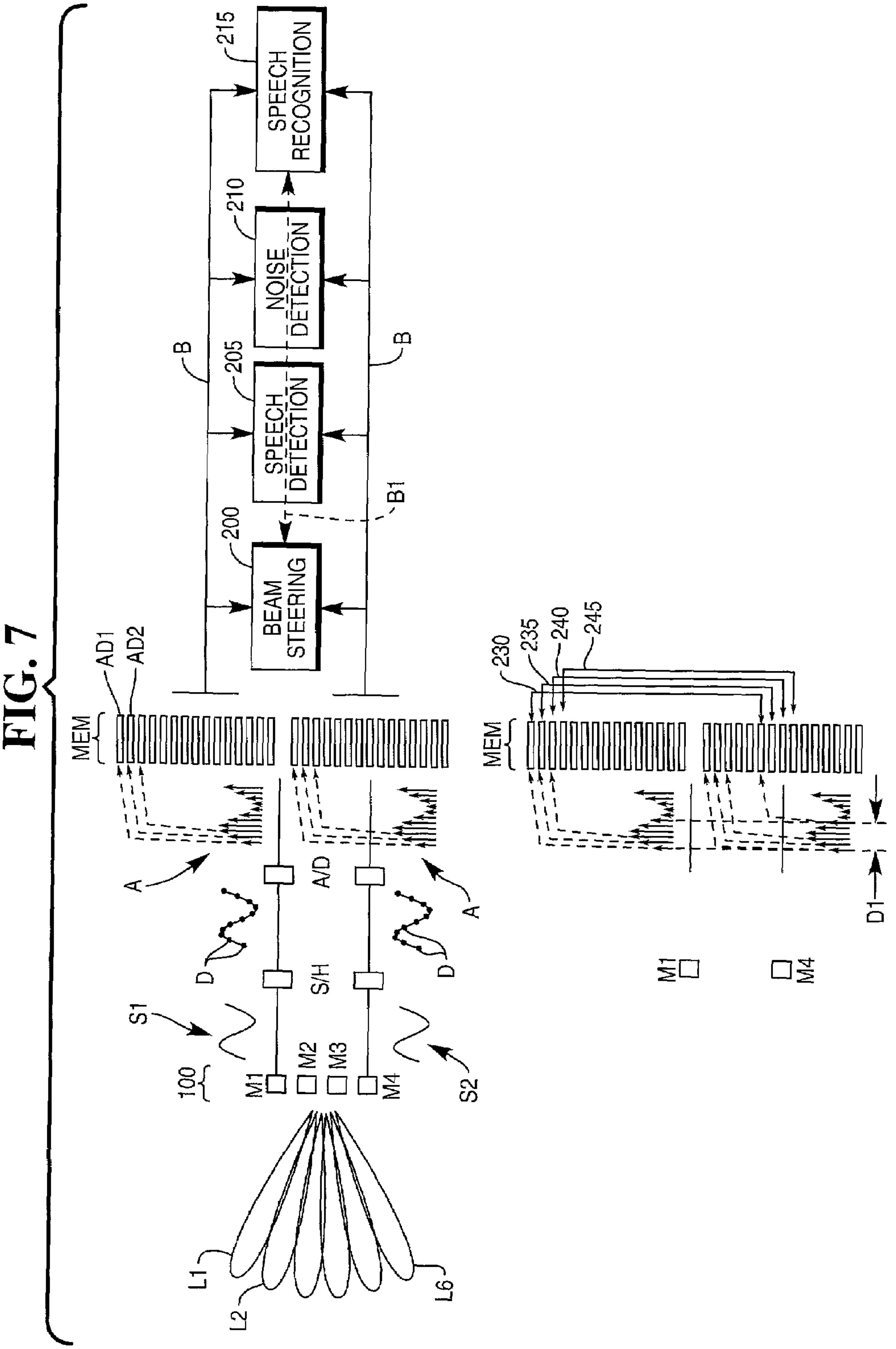
FIGS. 7, 9, and 10 each illustrate one form of the invention.

FIG. 7 illustrates an array of microphones 100, together with lobes L1–L6. The processing of the signals of microphones M1 and M4 will be taken as representative of the processing of the others.

Microphone M1 produces an analog signal S1, and microphone M2 produces an analog signal S2. Those signals are sampled by sample-and-hold circuitry S/H. Dots D represent the samples. Each sample D is digitized by analog-to-digital circuitry A/D, producing a sequence of numbers. Each arrow A represents a number. Each number is stored at an address AD in memory MEM.

Therefore, as thus far described, the system generates a sequence of numbers for each microphone. Each sequence is stored in a separate range of memory MEM. If a bandwidth of 5,000 Hz for the speech signal is sought, then the sample-and-hold circuitry S/H should sample at the Nyquist rate, which would be 10,000 samples per second, in this case. Thus, for each microphone, 10,000 numbers would be generated each second.

Beam steering apparatus 200 processes the stored numbers, to generate selected individual lobes L1–L6 for other apparatus to analyze. The other apparatus includes speech detection apparatus 205, noise detection apparatus 210, and speech recognition apparatus 215. Each apparatus 200, 205, 210, and 215 individually is known in the art, and commercially available.

Figure 4:
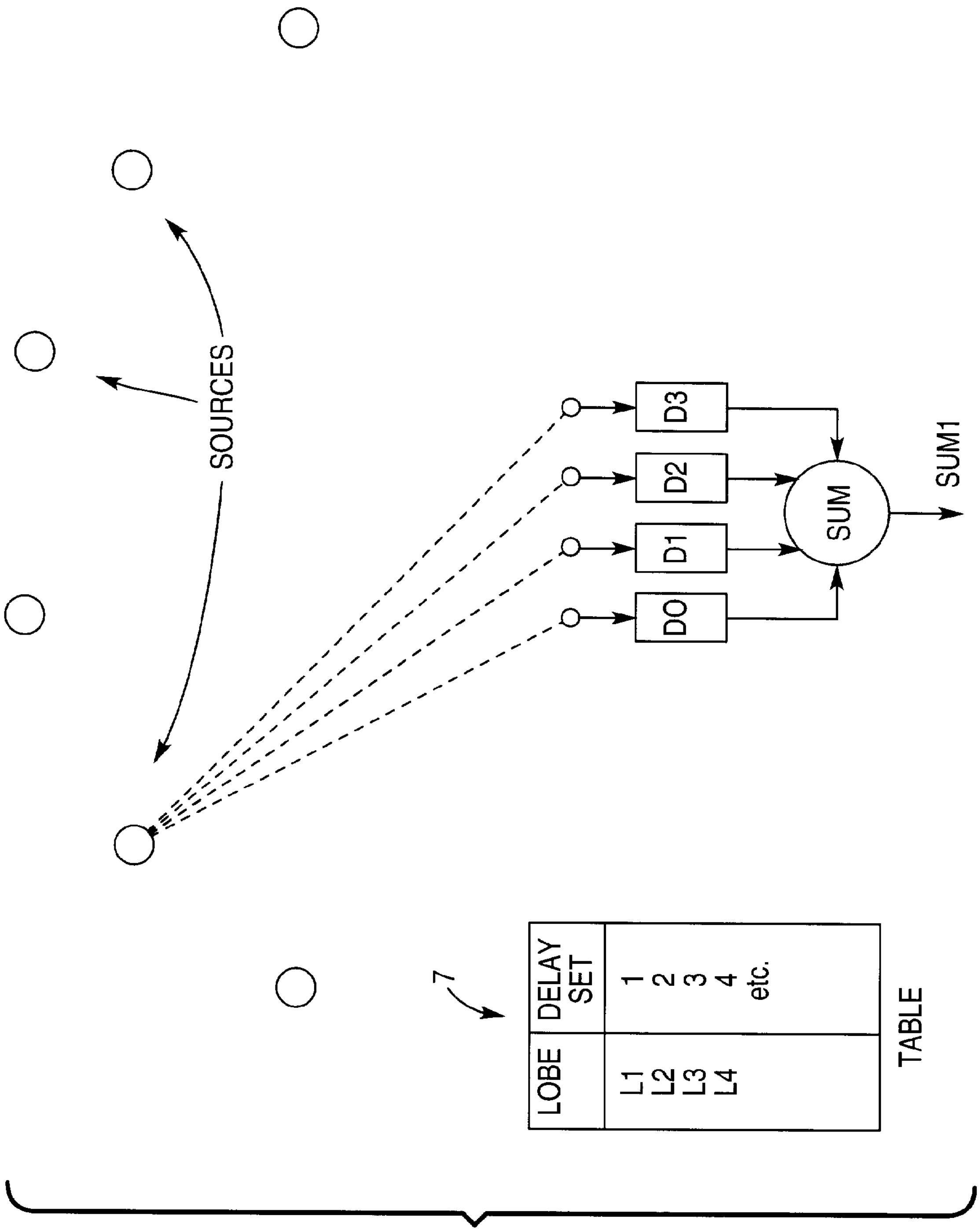
FIG. 4 illustrates that different sets of delays can preferentially amplify sound produced by different sources.
Figure 5:
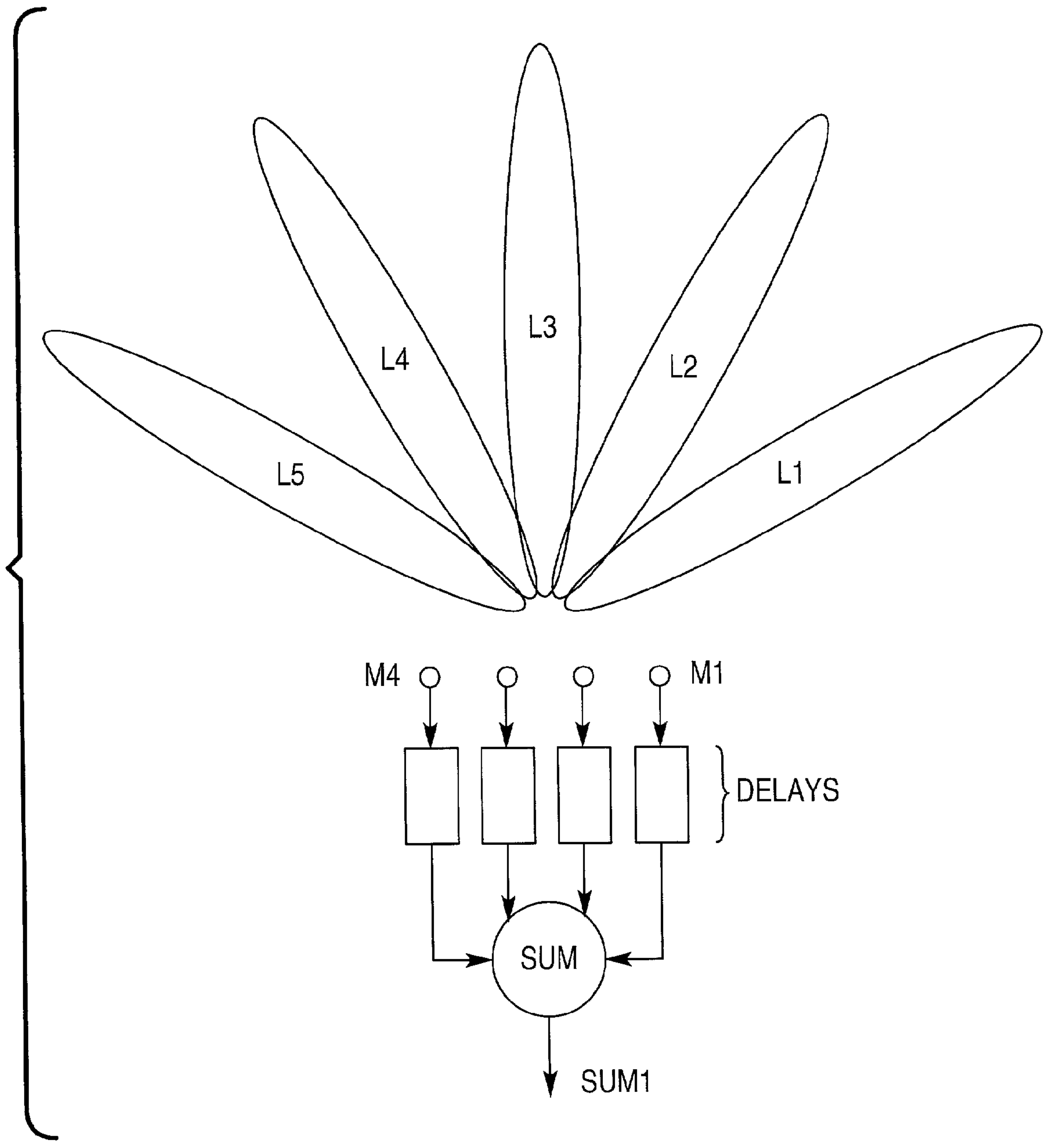
FIG. 5 illustrates the lobes L produced by the DELAYs.
Figure 6:
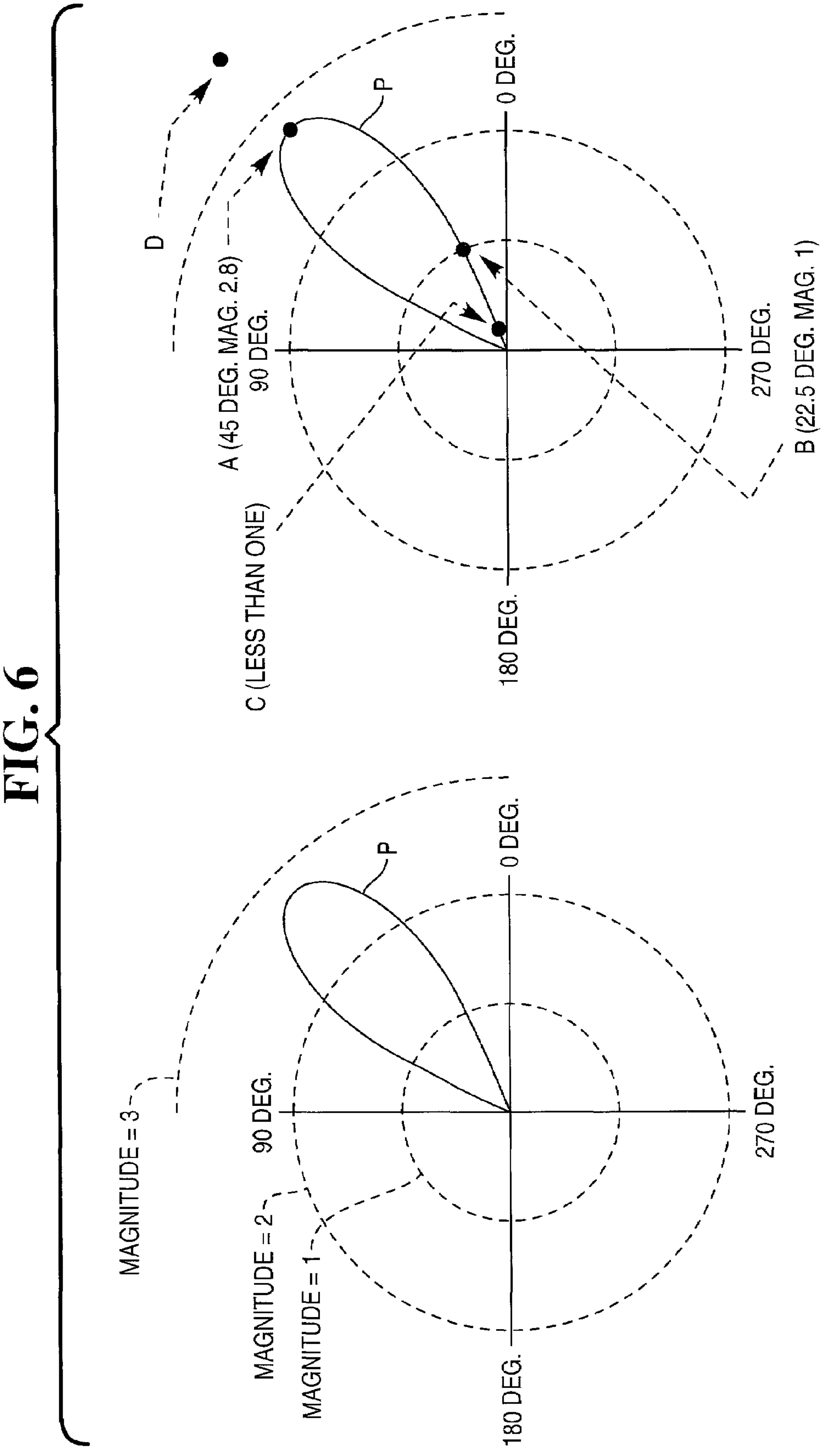
FIG. 6 illustrates polar geometric plots of a lobe P.

A basic principle behind the beam steering apparatus is the following. As explained in the Background of the Invention, as in FIG. 4, a set of delays is associated with, or generates, each lobe L. A lobe was selected, in real-time, by delaying each microphone signal by the appropriate delay in the set.

In the system of FIG. 7, a lobe is not always selected in real-time. Rather, a lobe can be selected after sound has been captured and digitized. That is, in FIG. 7, (1) each microphone M produces a sequence of numbers, (2) the rate at which the numbers are generated is known (10,000 numbers/second in the example above), and (3) the sequence of numbers is stored in memory MEM in the order produced. Consequently, the location of a number in memory MEM corresponds to the time-of-receipt of the signal fragment from which that number was derived.

Restated, the sequence of arrows A is stored in memory M in the order received.

Consequently, if two microphone signals are to be summed, analogous to the summation of summer SUM in FIG. 2, and a delay is to be imposed on one of the microphone signals, again as in FIG. 2, then the data within memory MEM in FIG. 7 can accomplish this as follows.

Assume that delay D1, at the bottom of FIG. 7, is to be imposed on the signal of microphone M4. To accomplish this, the pairs of numbers indicated by brackets 230, 235, 240, 245, and so on, would be added together. That is, each digitized output of microphone M1 is added to the digitized output of microphone M4 which was captured D1 seconds later.

Figure 1:
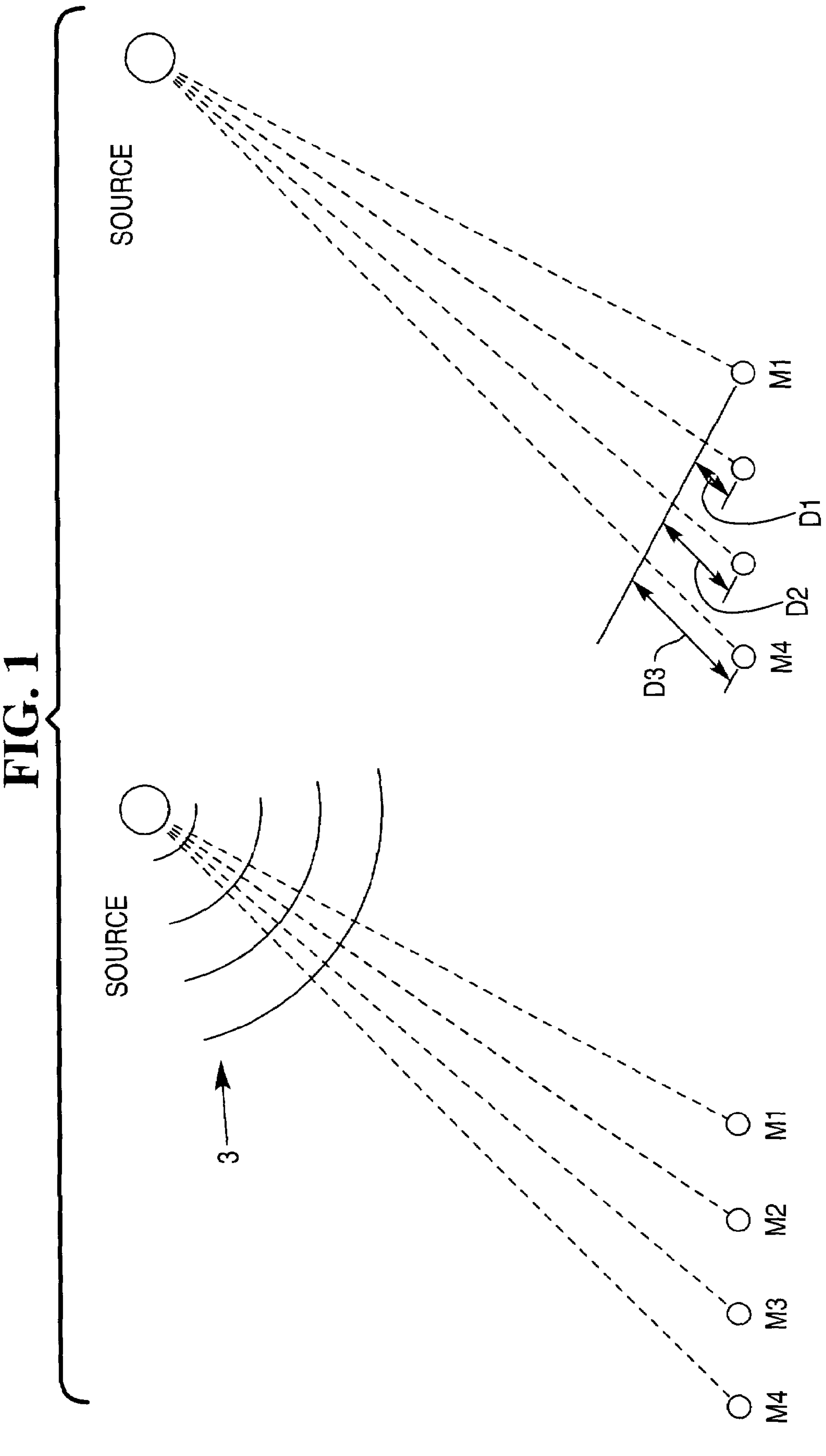
FIG. 1 illustrates an array of microphones M.
Figure 2:
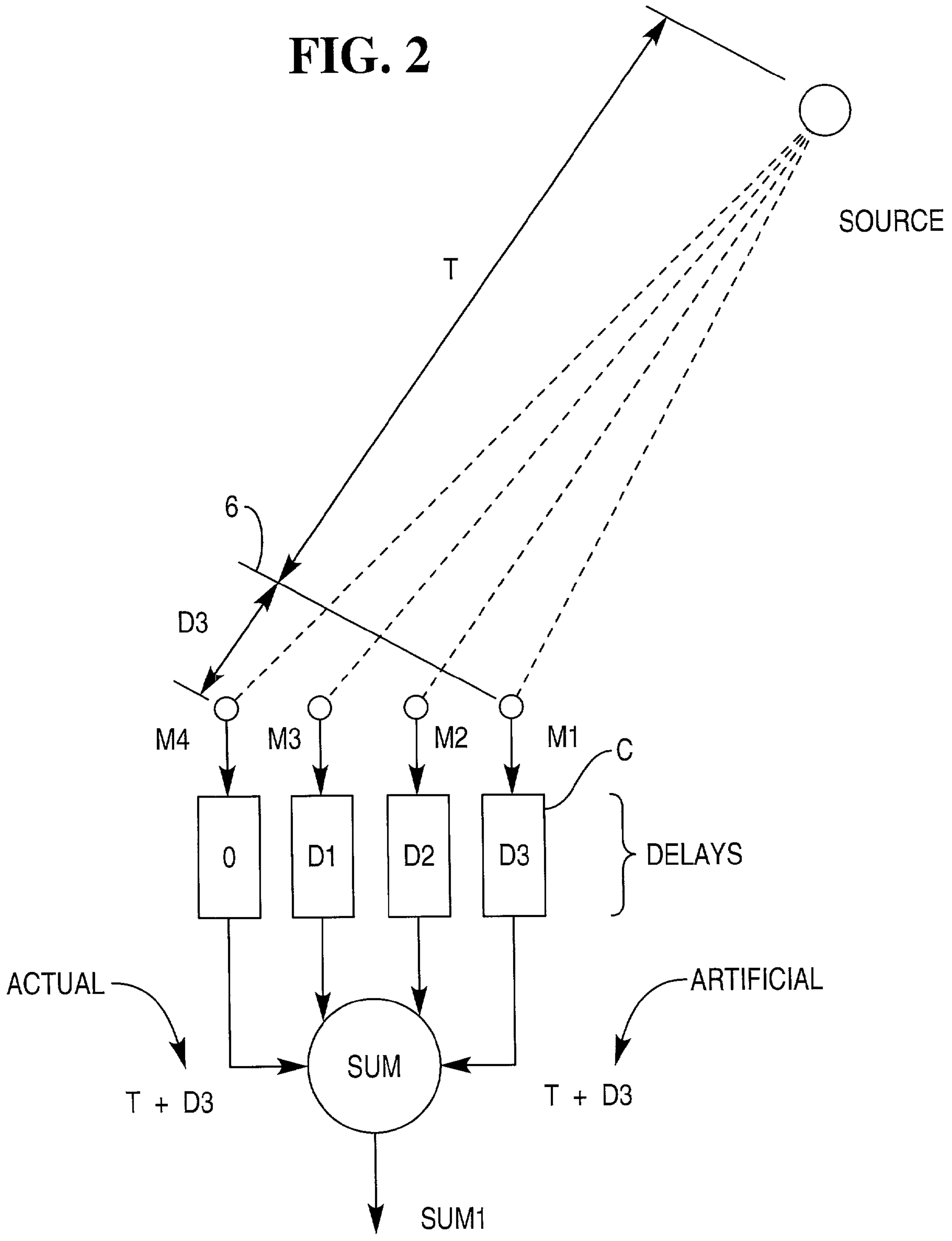
FIG. 2 illustrates artificial delays which are added to the signals produced by the microphones M, to preferentially amplify the signals received from the SOURCE.
Figure 3:
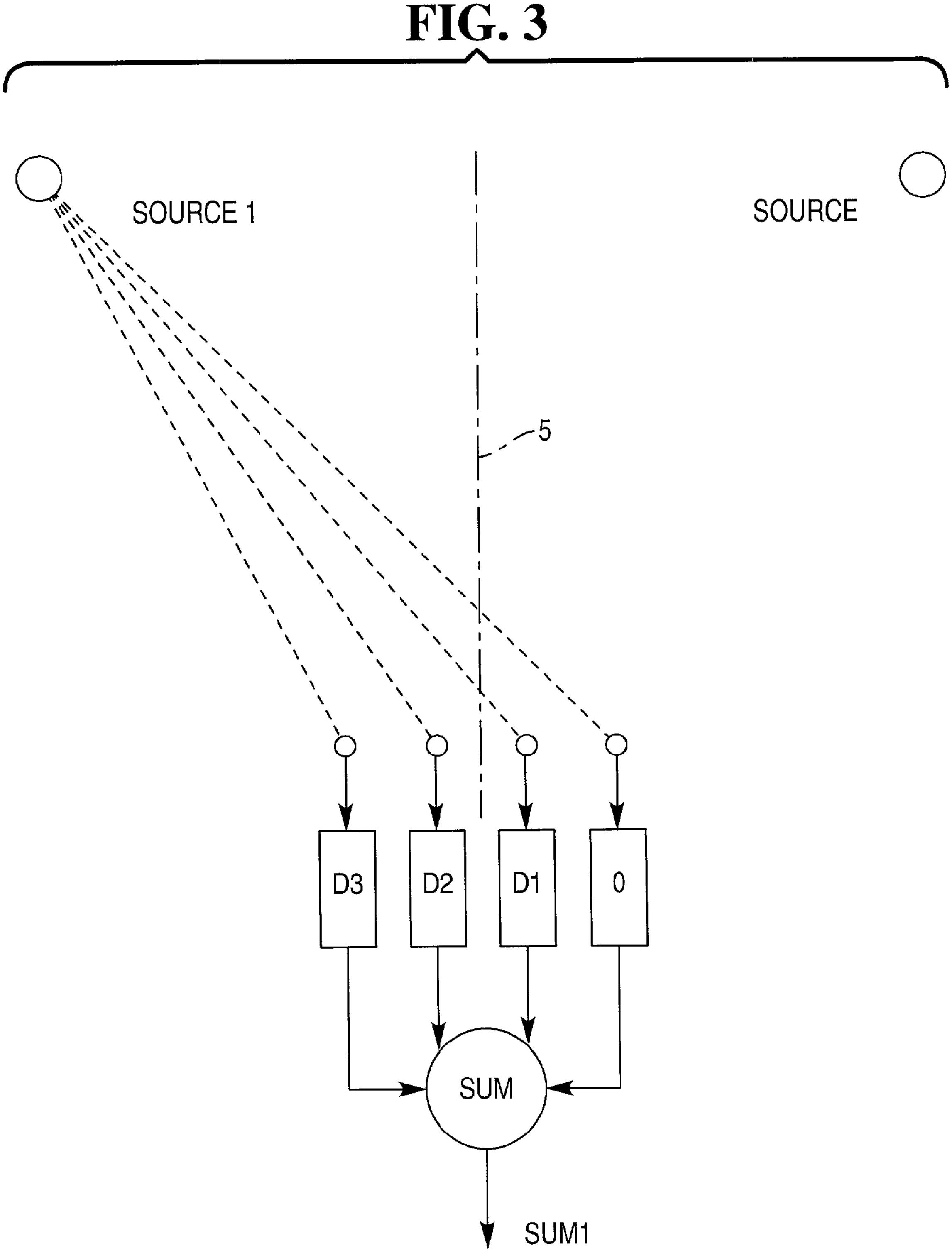
FIG. 3 illustrates different artificial delays which are added to the signals produced by the microphones M, to preferentially amplify the signals received from a different SOURCE 1.

In effect, the signal of microphone M4 is delayed by D1, and then added to the signal of microphone M1, analogous to the delay-and-addition of FIG. 2. Thus, by proper selection of the delay, such as D1, a selected lobe can be generated, from the data stored in memory M.

In this process, a basic problem to be solved is to select a lobe which (1) maximizes the speech signal received, and (2) minimizes the noise signal received. It is emphasized that the noise signal to be minimized is not the white noise signal identified as "N" in the well known parameter of signal-to-noise-ratio, S/N. White noise, strictly defined, is a collection of sinusoids, each random in phase, and all ranging in frequency from zero to infinity.

The noise of interest is not primarily white noise, but noise from an artificial source. The frequency components of the noise will not, in general, be equally distributed from zero to infinity. Two examples of the noise in question are (1) a humming air conditioner, and (2) an idling delivery truck. The symbol NC will be used herein to represent this type of noise signal.

Figure 8:
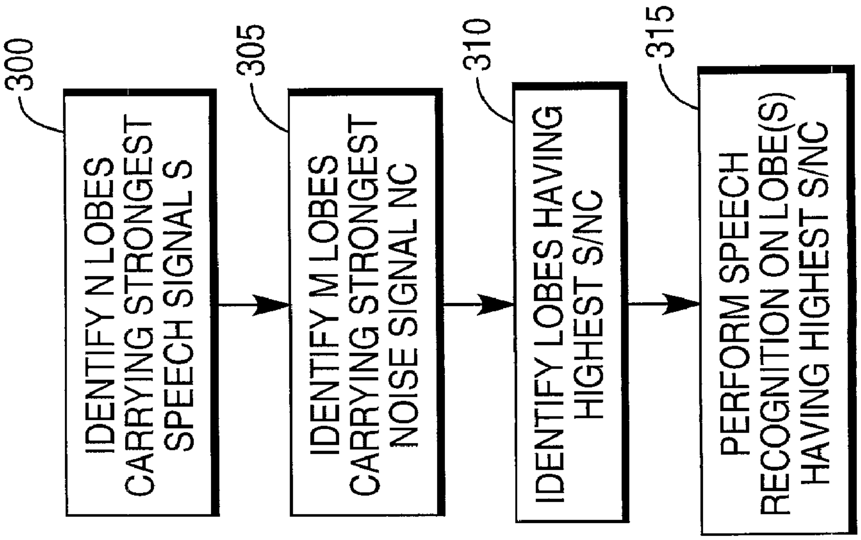
FIG. 8 is a flow chart of steps undertaken by one form of the invention.

FIG. 8 is a flow chart illustrating one approach to maximizing signal-to-noise ratio S/NC. In block 300, the lobes L are generated from the data stored in memory MEM in FIG. 7, and each is examined. The N lobes carrying the strongest speech signals S are identified. In block 305, the M lobes L carrying the strongest noise signal NC are identified. While these blocks 300 and 305 are represented as separate steps, and in many cases can be executed separately, they can also be executed together.

One reason is that, if sound is heard in a lobe, it may be assumed to be either speech or a repeating noise, such as the hum of an air conditioner. If it is identified as non-speech, then, by elimination, it is identified as noise. In this case, a single step identifies the noise. Of course, if the noise contains both speech and hum, then the single-step elimination is not possible.

Identification of the presence of speech signals is well known. For example, speech is discontinuous, while many types of artificial noise, such as the hum of an air conditioner, are continuous and non-pausing. Consequently, the pauses are a feature of speech.

Pauses can be detected by, for example, comparing long-term average energy with short-term average energy. In the case of the air conditioner, the short-term average energy, periodically measured during intervals of a few seconds, will be the same as the long-term average energy, measured over, say 30 seconds.

In contrast, for speech, the short-term average energy, similarly measured, but during periods of sound as opposed to silence, will be higher than the long-term average. (Measurement of short-term energy during periods of silence will produce a result of zero, which is not considered.) A primary reason is that the pauses in speech, which contain silence, reduce the long-term average.

Identification of continuous noise is also well known. Two types of continuous noise should be distinguished. If the noise is truly continuous, as in the constant hiss of air flowing through a heating duct, then derivation of a Fourier spectrum can identify the noise as non-speech. In theory at least, a constant, non-changing, Fourier spectrum will be found. This constant spectrum is not found in speech, and identifies the sound as continuous noise.

In contrast to truly continuous noise, the noise may continuous, but pulsating, as in an idling gasoline engine. Such noise is continuous, in the sense that it is ongoing, but is also constantly changing, since it is a series of acoustic pulses. Pulses change because they are ON, then OFF, then ON, as it were.

Pulsating noise will be characterized by a periodically changing Fourier spectrum, which also distinguishes the noise from speech.

Once blocks 300 and 305 identify the lobes having the highest speech and noise signals, block 310 takes the ratio S/NC for each lobe, and identifies the lobe having the highest ratio. In block 315, that lobe is used to perform speech recognition, by the apparatus 215 in FIG. 7.

The processing of blocks 300, 305, and 310 is undertaken by the apparatus 200, 205, 210, and 215 in FIG. 7, either individually or collectively. Those apparatus are given access to memory MEM, as indicated by busses B. Those apparatus can also share variables and computation results, as indicated by dashed bus B1.

Another approach can be used to identify the lobe having the highest ratio S/NC. The speech detection apparatus 205 in FIG. 7 and the noise detection apparatus 210 are not used. The beam steering apparatus 210 examines each lobe L, one after another. The speech recognition apparatus 215 attempts to perform speech recognition on the lobe, and a figure of merit is produced, indicating the success of the result. A figure of merit, as on a scale from zero to 100, is generated for each lobe.

For example, each of the words produced by the recognition apparatus 215 is compared with a stored dictionary of the language expected (e.g., English, French). A tally is kept of the number of words not found in the dictionary. The lobe producing the smallest number of words not found in the dictionary, that is the smallest number of words not found in the vocabulary of the language expected, is taken as the best lobe. That lobe is used.

Alternately, many speech-recognition systems perform their own internal evaluations as to the recognizability of words. For example, when such a system receives a non-recognizable word, it produces an error message, such as "word not recognized." Such a system can be used. The lobe which produces the smallest number of non-recognized words is taken as the best, and used for the speech recognition of block 315 in FIG. 8.

Additional Considerations

Figure 9:
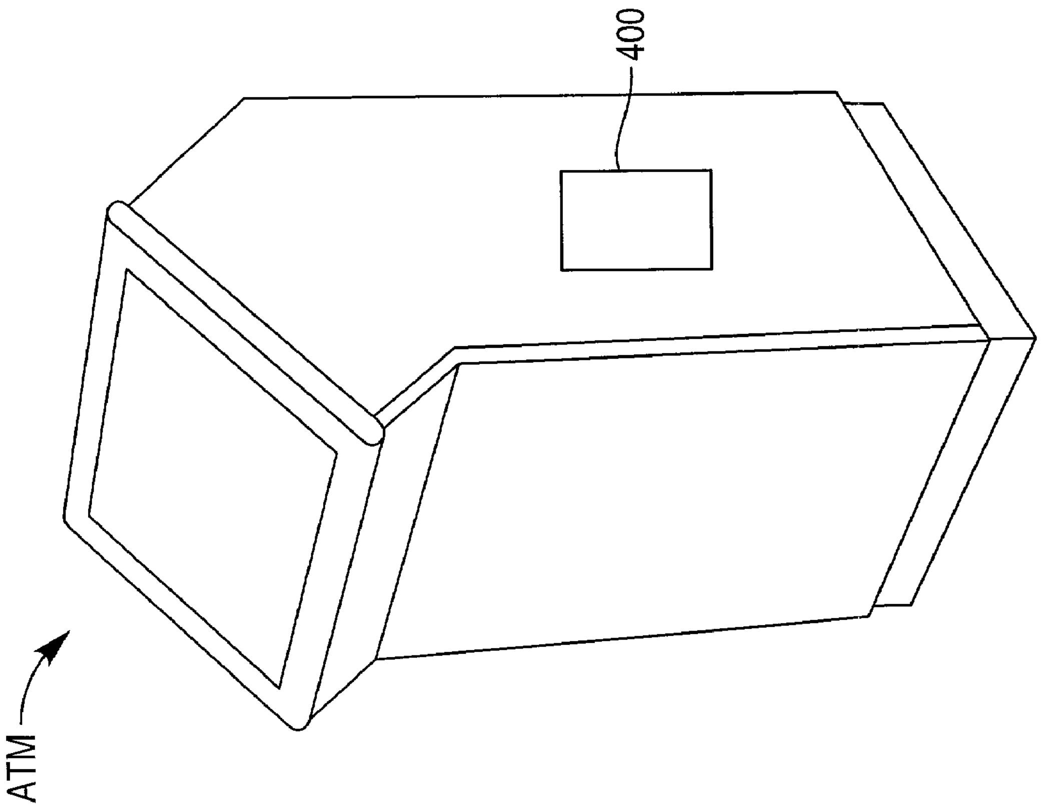

1. The invention can be used in self-service kiosks, such as Automated Teller Machines, ATMs. In FIG. 9 an ATM is shown. Block 400 represents all, or part, of the apparatus shown in FIG. 7, together with apparatus which performs the analysis described in connection with FIG. 8. ATMs are known, and equipment typically contained in an ATM is described in U.S. Pat. No. 5,604,341, issued Feb. 18, 1997, to Grossi et al. This patent is hereby incorporated by reference.

The apparatus of FIG. 9 allows a customer to speak a Personal Identification Number, PIN, in order to log in. It also allows the customer to select a transaction, as by verbally specifying one of several options presented, as by saying "A," when A represents the option of withdrawing cash. The ATM presents the options on a display screen (not shown).

It also allows the customer to specify a monetary amount, as by saying "One hundred dollars," of by selecting an amount from a displayed group of amounts, as by saying "Amount B."

Figure 10:
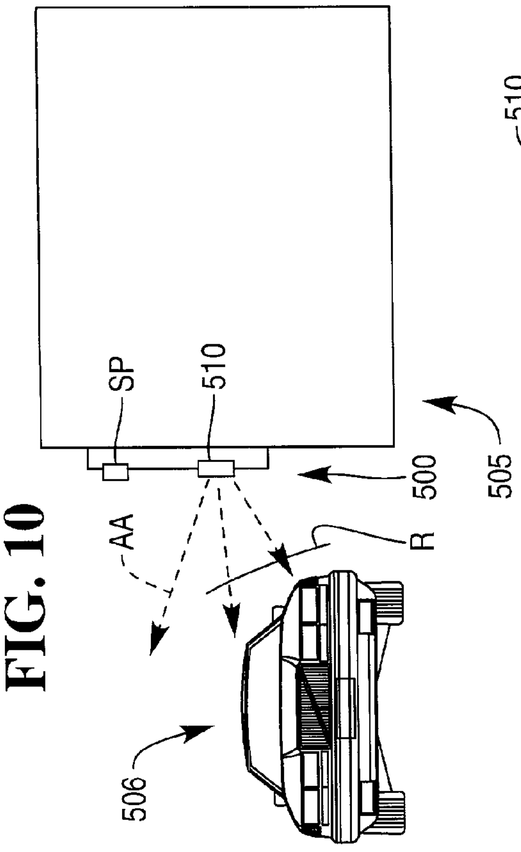
Figure 11:
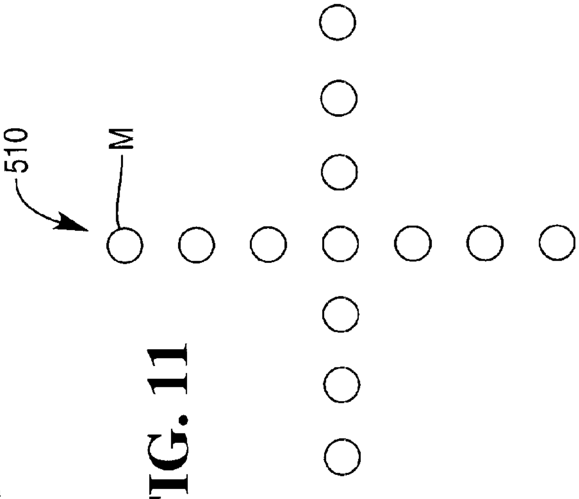
FIG. 11 illustrates a two-dimensional array 510 of microphones M.

2. The invention can be used independent of the speech-recognition function. FIG. 10 Illustrates a drive-up window 500 in a fast-food restaurant 505, wherein a driver (not shown) of an automobile 506 speaks to a two-dimensional microphone array 510, shown also in FIG. 11. The two-dimensional array 510 produces a three-dimensional pattern of lobes, represented by arrows AA in FIG. 10, and in FIG. 12, which is a top view.

The invention examines each lobe AA, seeking the best ratio S/NC, and then uses that lobe for communication with the driver.

Figure 13:
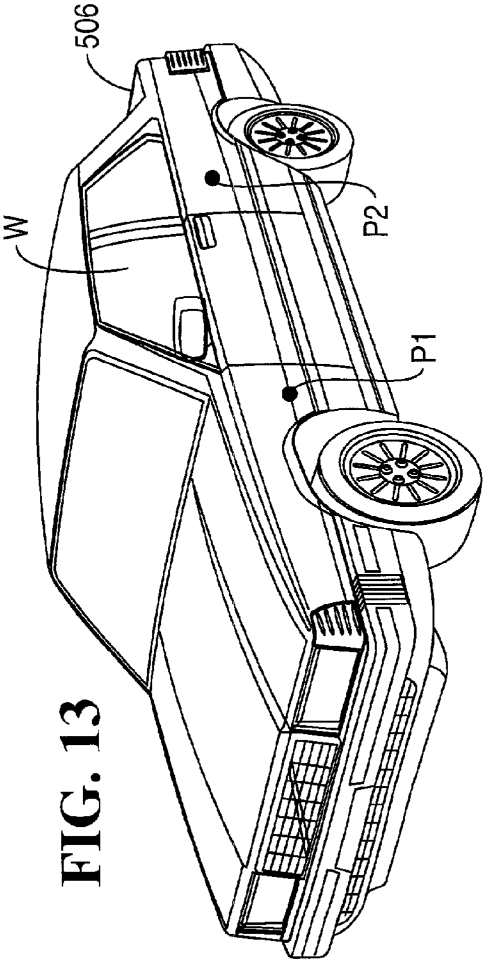
FIG. 13 illustrates acoustically hard points P1 and P2 on an automobile, as well as an acoustically soft open window W.

3. Another approach involving the automobile 506 recognizes that most of the automobile 506 is acoustically hard. That is, much of the sound striking points such as P1, P2, and so on in FIG. 13, will be reflected. However, the driver will communicate through an open window W, which will be acoustically soft, and will not reflect as greatly.

Figure 12:
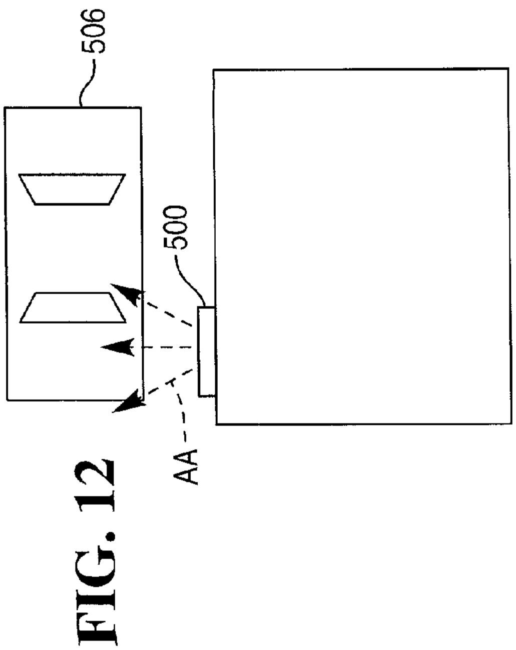
FIG. 12 is a top view of FIG. 10, showing an automobile 506 at the drive-up window of a fast-food restaurant.

Thus, in this approach, a loudspeaker SP in FIG. 10 produces a sound, such as a hum, and the lobes AA of FIGS. 10 and 12 are scanned, searching for reflected hum. The lobes containing minimal reflected hum are taken as the lobes pointing into the automobile window W in FIG. 13.

Of course, these lobes must point into a region in space R in FIG. 10 which is expected to contain the open window. Region R is defined empirically, as by taking the Cartesian coordinates of the open windows for each of a sampling of automobiles located at the drive-up window, such as 1,000 automobiles. Based on the samples, a representative region R in space is chosen.

The lobes selected as containing minimal reflections must pass through that region R.

4. The invention seeks to identify a lobe having a maximal ratio S/NC, or (speech)/(artificial noise). Numerous approaches exist for optimization. For example, a threshold may be established, which represents a sound level which speech is not expected to exceed. In effect, very loud noises will be ignored as speech. All lobes are scanned. If the sound level in a lobe exceeds the threshold, that lobe is nulled, and not used.

As another example, a minimal level of sound can be established which is considered acceptable. If a lobe does not reach the minimum, no search for voice, artificial noise, or both, is undertaken in that lobe. In effect, such lobes also become nulls: they are not used.

Thus, lobes which are too loud, or too soft, are ignored. Wiener filtering, or spectral subtraction, can be used to remove stationary (in the statistical sense) noise signals, which represent background noise.

5. In addition to steering a microphone lobe to a desired location, the system can be used to steer a video camera to the same location, using the coordinates of the lobe. That is, the speech of a speaking person is used to locate the head of the person, using the microphone array described herein, and a camera is directed to that location. Camera-steering can be useful in video conferencing systems, where a video image of a talking person is desired.

Steering a microphone lobe can also be useful in a larger group of people, such as an audience of people in a lecture hall or television studio. The lobe is steered to a specific person of interest.

The invention can be used in connection with coin-type pay telephones, which do not utilize removable handsets. Instead, the telephones are of the "speakerphone" type. The invention actively and dynamically steers a microphone lobe to the mouth of the person using the telephone. If the person moves the head, the invention tracks the mouth displacement, and steers the lobe accordingly, to maintain the lobe on the mouth of the person.

In addition, a loudspeaker array can focus one of its lobes to the location of the person's ear. This focusing process would be based on the position of the microphone lobe. That is, the ears of the average adult are located, on average, X inches above, and Y inches to either side of the mouth. If the position of the mouth is known, then the position of the ears is known with relative accuracy. In any case, absolute accuracy is not required, because the speaker lobes have a finite diameter, such as six inches.

Further, focusing the speaker lobes to the same position as the microphone lobe, namely, to the speaker's mouth, is seen as a usable alternative. One reason is that, because of the diameter of the lobe, part of the lobe will probably cover the speaker's ear. Another is that humans detect sound not only through the ear itself, but also through the bones of the head and face.

Numerous substitutions and modifications can be undertaken without departing from the true spirit and scope of the invention. What is desired to be secured by Letters Patent is the invention as defined in the following claims.

What is claimed is:

1. Apparatus comprising:
a) a self-service kiosk which dispenses articles, currency, or communication services; and
b) within the kiosk,
i) a steerable beam microphone array, having multiple lobes;
ii) means for sampling lobes, and
A) distinguishing the difference between speech content and noise content from sound signals received by each lobe,
B) identifying lobes having a relatively high speech content,
C) identifying lobes having a relatively low noise content, and
D) actuating a lobe having both a relatively high speech content and relatively low noise content.

2. Apparatus according to claim 1, and further comprising:
c) speech recognition means for recognizing speech contained in the lobe actuated.

3. A method, comprising the following steps:
a) maintaining a self-service kiosk which dispenses articles, currency, or communication services;
b) maintaining a beam-steerable microphone array at the self-service kiosk;
c) measuring noise content and speech content of several lobes of the array; and
d) selecting a lobe which carries
i) larger speech signals than other lobes and
ii) smaller noise signals than other lobes.

4. Method according to claim 3, and further comprising the step of:
e) receiving signals from the lobe selected, and performing speech recognition on the data.

* * * * *